United States Patent [19]

Serrano

[11] Patent Number: 4,870,981
[45] Date of Patent: Oct. 3, 1989

[54] SETTING CHAMBERS FOR CONCRETE PARTS

[76] Inventor: Alberto B. Serrano, Avda. Nazarert 10, 28009 Madrid, Spain

[21] Appl. No.: 172,703

[22] Filed: Mar. 23, 1988

[30] Foreign Application Priority Data

Apr. 1, 1987 [EP] European Pat. Off. ......... 87500012.7

[51] Int. Cl.$^4$ ................................................. B08B 3/02
[52] U.S. Cl. .................................... 134/56 R; 134/84; 134/88; 134/140; 134/151; 134/198; 134/200; 134/201
[58] Field of Search ...................... 134/56 R, 58 R, 84, 134/85, 88, 104, 137, 133, 140, 151, 198, 200

[56] References Cited

U.S. PATENT DOCUMENTS

| | | | |
|---|---|---|---|
| 2,582,789 | 1/1952 | Morrison | 134/133 X |
| 2,708,943 | 5/1955 | Watson | 134/133 X |
| 3,565,725 | 2/1971 | Siempelkamp | 100/198 X |
| 4,015,615 | 4/1977 | Weber et al. | 134/200 X |
| 4,285,353 | 8/1981 | Colomer | 134/200 X |
| 4,768,533 | 9/1988 | Hall | 134/200 X |

Primary Examiner—Frankie L. Stinson
Attorney, Agent, or Firm—Ladas & Parry

[57] ABSTRACT

The invention deals with some improvements on chambers intended for setting concrete parts, as well as with the necessary complementary components to transfer the concrete parts from the production machine up to the chamber part outlet. One of the improvements consists of a certain mechanism, named transfer unit, which carries out the transportation of panels loaded with parts from the moulding machine up to a lifter responsible for raising and introducing those panels in the different floors of the chamber. Another improvement consists in providing the lifter with a counterweight stop and some moving arms to push the panels properly and prevent them from getting on top of each other, as well as to open the respective chamber gates. The chamber is a little bit inclined to facilitate the panel movement. Another improvement consists of a rolling path made up of a wheel-shaft-self-levelling bracket assembly as well as a spray watering system and an individual little roof per floor.

12 Claims, 9 Drawing Sheets

SETTING CHAMBERS FOR CONCRETE PARTS

Within the production field of concrete components, a remarkable place is occupied by the so called "curing chambers", where setting of the concrete parts takes place for their subsequent commercialization and use.

The current technology presents two different operating systems. The first system uses steam as a setting medium, and the second one is called natural setting since it takes advantage of the heat given off during the setting process.

These two systems exhibit certain drawbacks which can be overcome with out improvements.

The steam setting system should be discarded because of the high cost to produce the necessary steam. Furthermore, its corrosive nature causes the metallic components of the system to be attacked resulting in a grave deterioration of those parts and their replacement, and consequent investment, in a short period of time.

Therefore, considering only the so called "natural setting", it can be said that the well known setting chambers for concrete parts, through a natural curing, form an actual system to treat and handle this type of parts since they leave the moulding machine until they are taken out for their storage and subsequent distribution.

These treatment and handling systems basically consist of a roller conveyor belt where parts, when they leave the moulding machine, are placed on a panel located upon the conveyor belt. This panel can usually contain several parts placed one beside each other.

These parts are transported by the conveyor belt up to a metallic framework lifter that rises and descends in accordance with the working pace of the system to introduce parts loaded on the panel in the setting chamber.

The setting chambers consist of several floors vertically and horizontally aligned to form some niches provided with inlet and outlet openings. The chamber length usually is considerable so that they can store, on each floor, a large quantity of panels fully loaded with parts. These parts should remain inside the chambers for a certain time until concrete setting is obtained.

On the other hand, panels loaded with parts move inside the chamber pushing each other until all floors are full. This movement is carried out along a rolling path whose metallic rollers are supported by bearings at each end.

These type of chambers or setting systems for concrete parts show great drawbacks, namely:

(1) Chambers of this type have no a watering system. That is why they are not suitable for concrete setting in warm climates.

(2) Concrete part panels are usually made of wood. That is why their life is very short since the moisture attacks this material and causes the panels to be replaced very frequently. This gives an origin to a very important expense as the number of panels used in the system is very high. On the other hand, panels should be very thick because they are made of wood.

(3) A fully loaded panel can get on top of the precedent, when they enter the chamber, as the movement is obtained by pushing one panel to each other. This may cause serious problems to the continuous operating process and even cause the concrete parts to be broken.

(4) The rolling path of the different floors of the chamber consists of metallic rollers supported at each end by suitable bearings. As moisture corrodes these metallic rollers they should be replaced frequently which means a waste of time and considerable additional cost.

(5) Chambers cannot be very long because of their horizontal shape to allow panels to push one to another until the chamber is full.

All these problems and drawbacks can be eliminated by means of the improvements concerning this invention obtaining, in consequence, a better production efficiency.

Therefore, one of the main purposes of this invention is to have the possibility of using very fast moulding machines to obtain a bigger number of parts in the same time. To do so, a transfer unit is provided between the moulding machine and the lifter. This transfer unit moves panels loaded with parts from the roller conveyor belt up to the lifter in a fast way and with enough time to allow the fastest moulding machines present in the current market to work properly.

Another feature of the invention consists of some gusset plates fitted to the lifter so that it may open the different floor gates of the chamber as it is going up. Gates are opened at the very moment the panels loaded with parts are introduced in the chamber.

Another feature of the invention consists in providing the floor gates with a fast opening-closing system so as to prevent a strong heat waste.

The closing and opening action takes place in a swivelling way since each gate has a connecting rod which moves at the very moment the gate is pushed, allowing it to be opened, and returning by itself when the push action is stopped; that is, when it comes to its rest position.

Another feature of the invention consists of providing the lifter with a counterweight stop which pushes the last panel introduced in the chamber when the next one is about to enter it.

During the back movement this stop drops and looses contact with the panel to recuperate again its operating position at the end of the returning travel. As the pushing action is made by the counterweight stop, and not by the own panels, one panel could never get on top of the precedent. This allows to use less thick panels; that is, metallic panels which may increase the durability and reduce costs.

Another feature of the invention consists in providing the setting chamber with a certain inclination to the rear of the same, which facilitates the panel movement and allows the chambers to be lengthened in a considerably way to improve the production efficiency.

Another feature of the invention consists of providing the setting chambers with a watering system, with spary nozzles, to maintain the necessary moisture inside the chamber and, therefore, in the concrete parts. This system covers the "curing" necessities of this material (concrete parts) in dry and warm climates.

Another feature of the invention consists of providing the chamber with some roofing made up of a cover located under the rolling path of each floor. On using these covers, the heat waste from lower to upper floors is efficiently prevented, as well as the water dripping which causes an important deterioration to parts located in the lower floors. The water dispersion is also avoided allowing this water to be properly canalized up to the drain outlet.

All these features, as well as the advantages which derive from them, may be better understood through the illustrations enclosed to this report. It is important to say that these illustrations have a purely orientative and not restrictive character.

FIG. 1 shows a schematic side view of the chamber in which the descending inclination to the rear of it may be perfectly seen. It is also very noticeable the great number of floor supported by some suitable struts.

One of the chamber floors is shown in FIG. 2 through a schematic end view from the inside. The little roof and the watering system are preferably noticeable in this illustration.

FIG. 3 shows in a schematic way the transfer unit at rest. It may also be seen the lifter and the chamber inlet side.

A similar view to that of FIG. 3 is shown in FIG. 4. The transfer unit is at work. It has gone up to transfer a panel loaded with parts up to the roller conveyor belt.

FIG. 5, similar to those two previous illustrations, shows the transfer unit at the very moment it places a panel loaded with parts on the lifter.

FIG. 6 the transfer unit has returned to its rest position and the lifter is rising to locate a panel inside one of the chamber floors.

FIG. 7 shows a schematic view of the lifter gusset plate positioned in front of the respective gate of one of the chamber floors.

In FIG. 8, similar to the previous one, the gusset plate is pushing the gate and causing it to open.

FIG. 9 is similar to those two previous illustrations. The gusset plate is not shown but the panel pushing element can be seen when it enters the chamber.

In FIG. 10 the pushing element is at an operating position; that is, it is pushing the last panel at the same time the next one is about to enter the chamber.

The pushing element is shown, in FIG. 11, when it is at the returning travel. It can be seen how the stop drops to allow this returning movement to take place.

Figure 1:
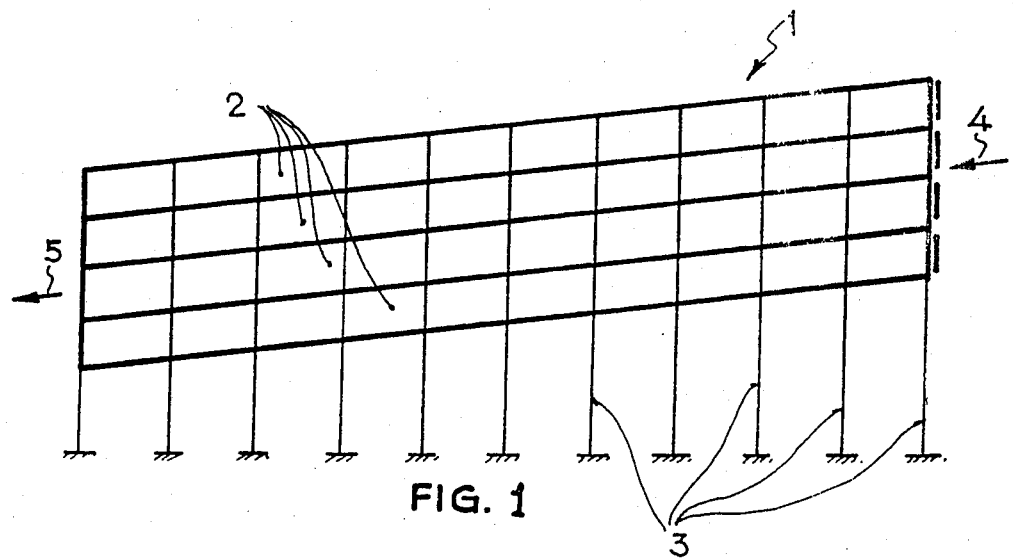

In accordance with the illustrations described above, and referring in detail to FIGS. 1 and 2, it can be seen how the chamber (1) consists of several floors (2) which form a whole assembly supported by some suitable struts or columns (3). Arrows of FIG. 1 indicate the chamber (1) inlet (4) and outlet (5) for the concrete parts. Every floor is provided with its respective support (6) which can be forged on metallic structured to braket the pairs of beams (7) on which the self-levelling wheels (8) are mounted to set up the rolling path for panels (9) loaded with concrete parts (10) to roll on. Likewise, crossmembers (11) are fitted to this support (6) to bracket the watering system. This sytem consists of a side (12) and central (13) pipe network, provided with spray nozzles, which runs from one floor to another in a longitudinal direction. Watering the concrete parts (10) is automatically carried out and programmed in accordance with the "curing" or setting necessities of such parts (10).

Figure 2:
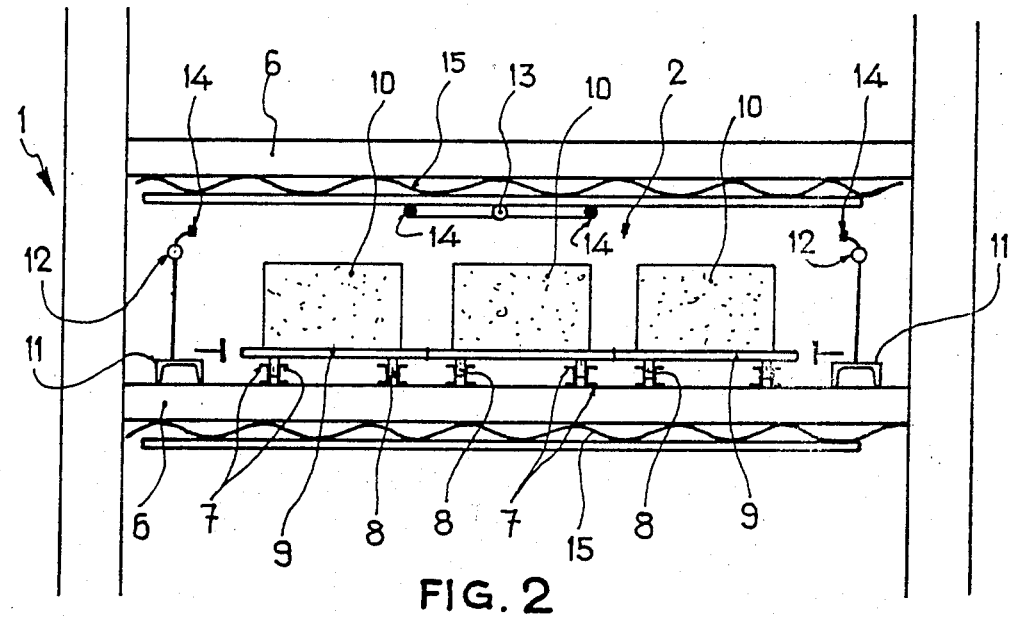
Figure 3:
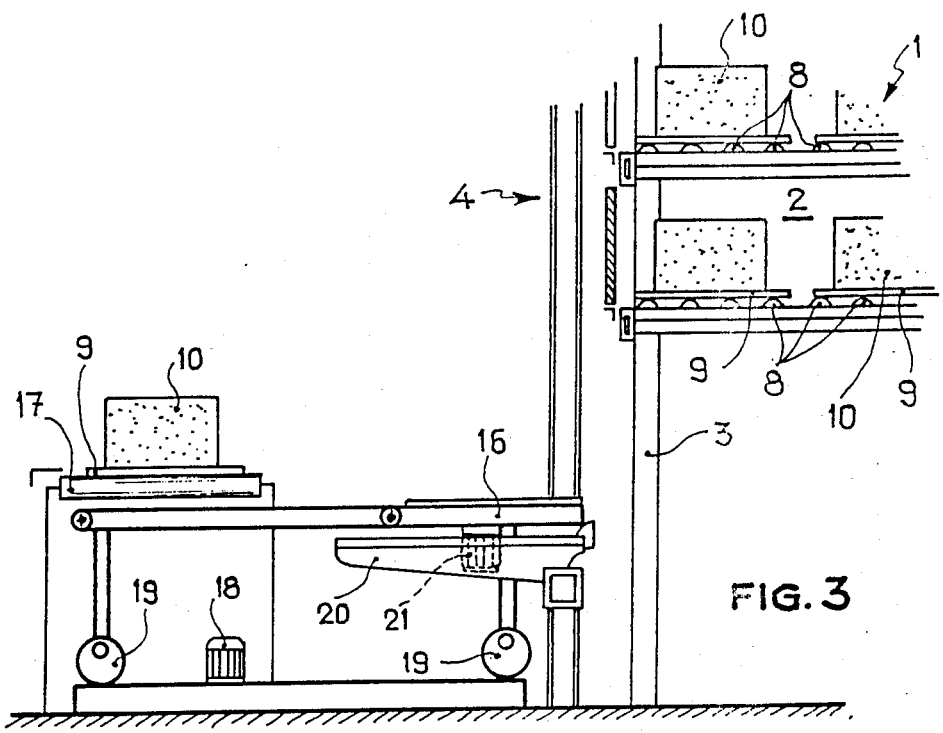
Figure 4:
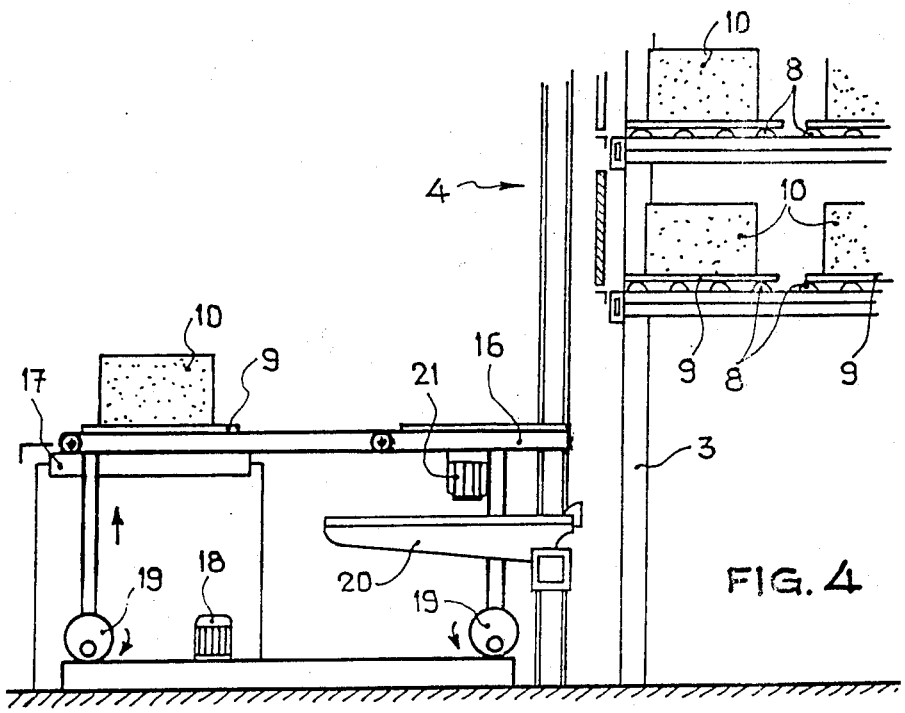
Figure 5:
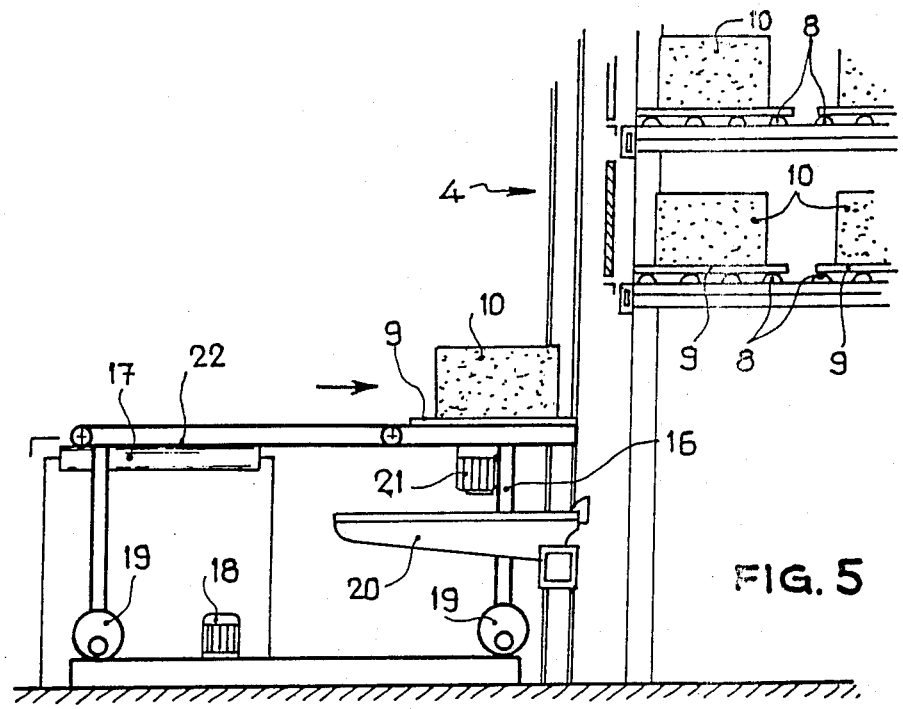
Figure 6:
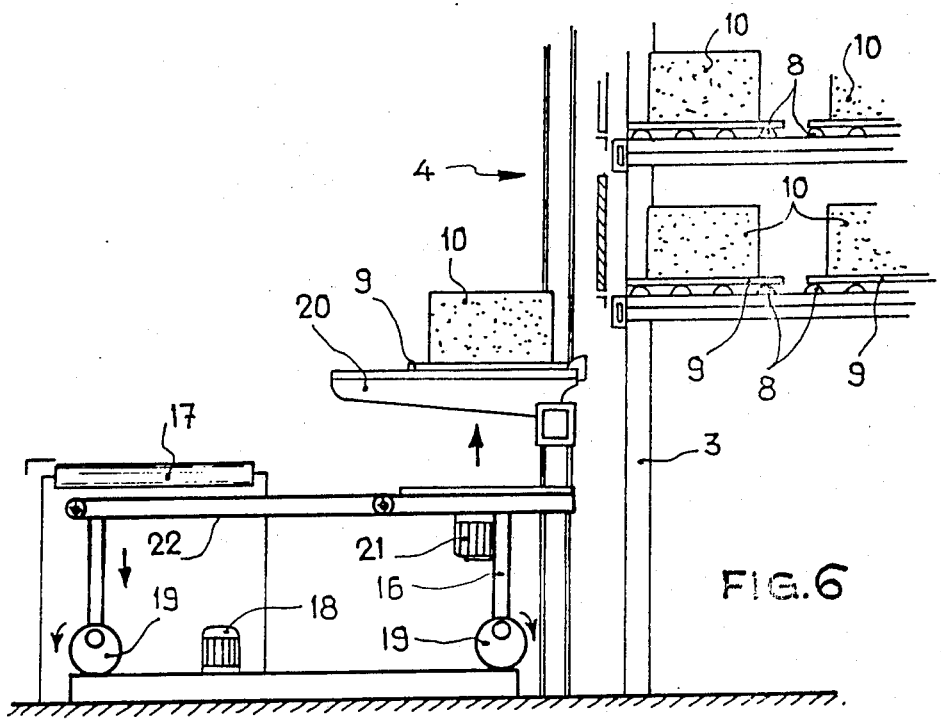
Figure 7:
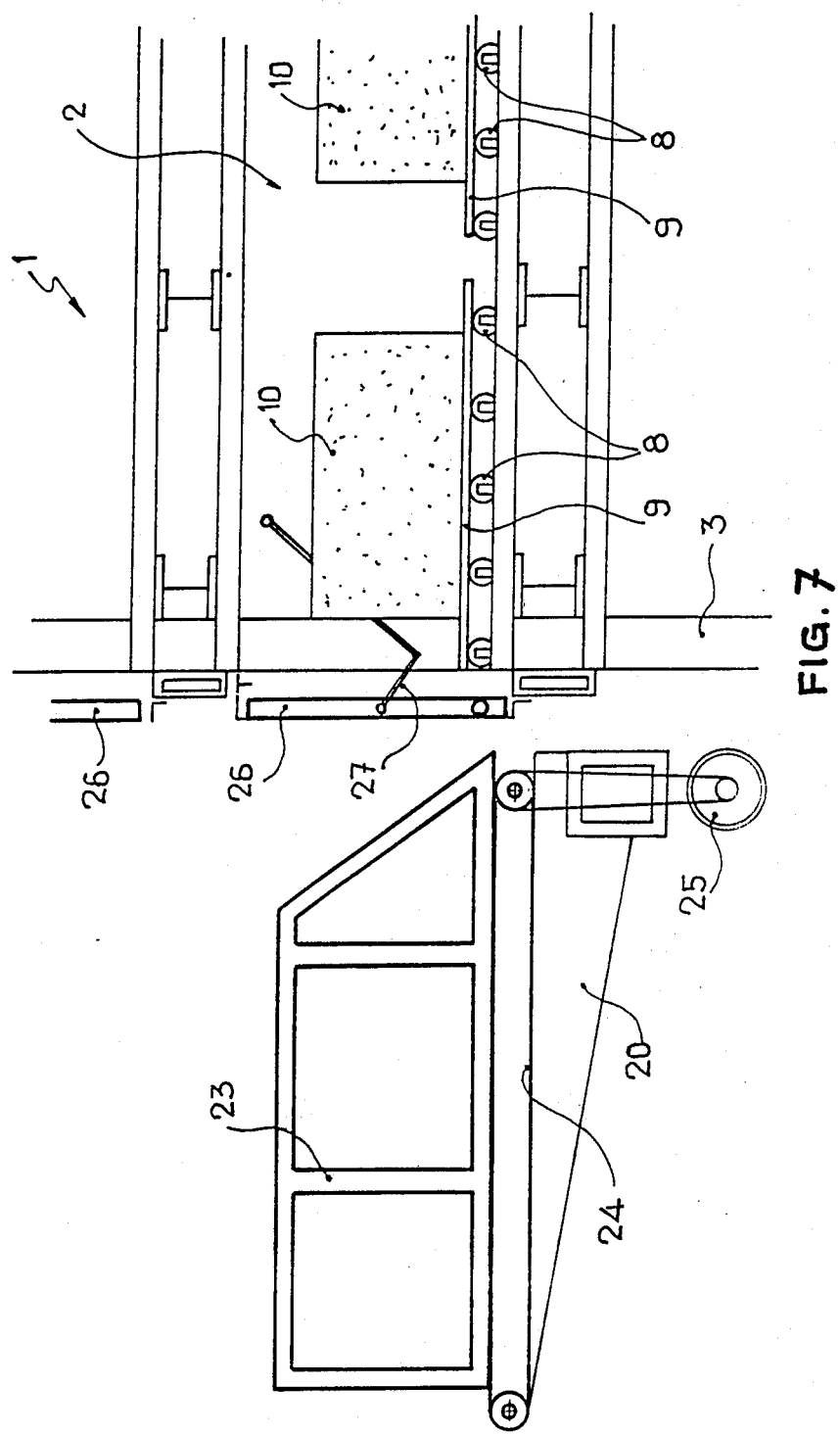
Figure 8:
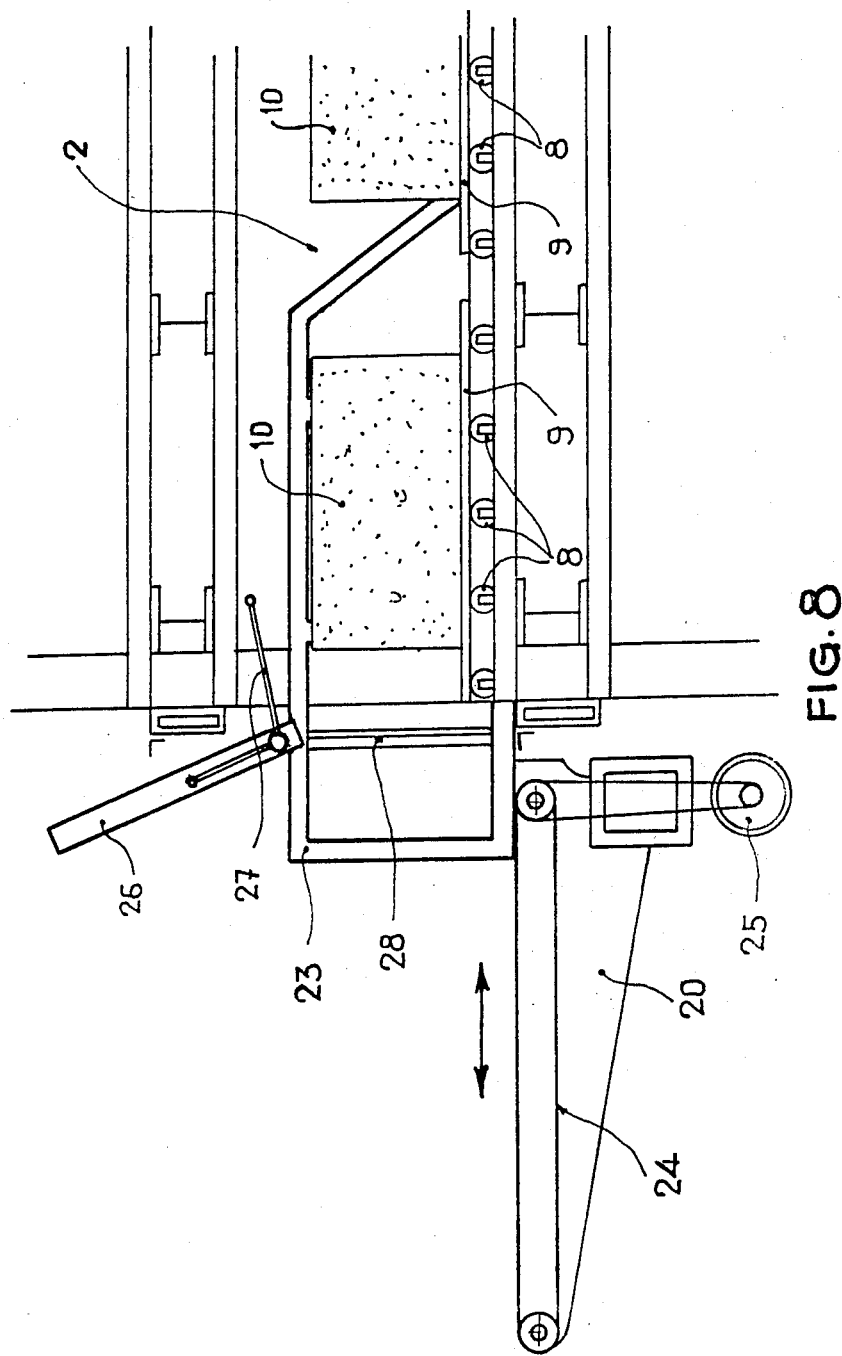
Figure 9:
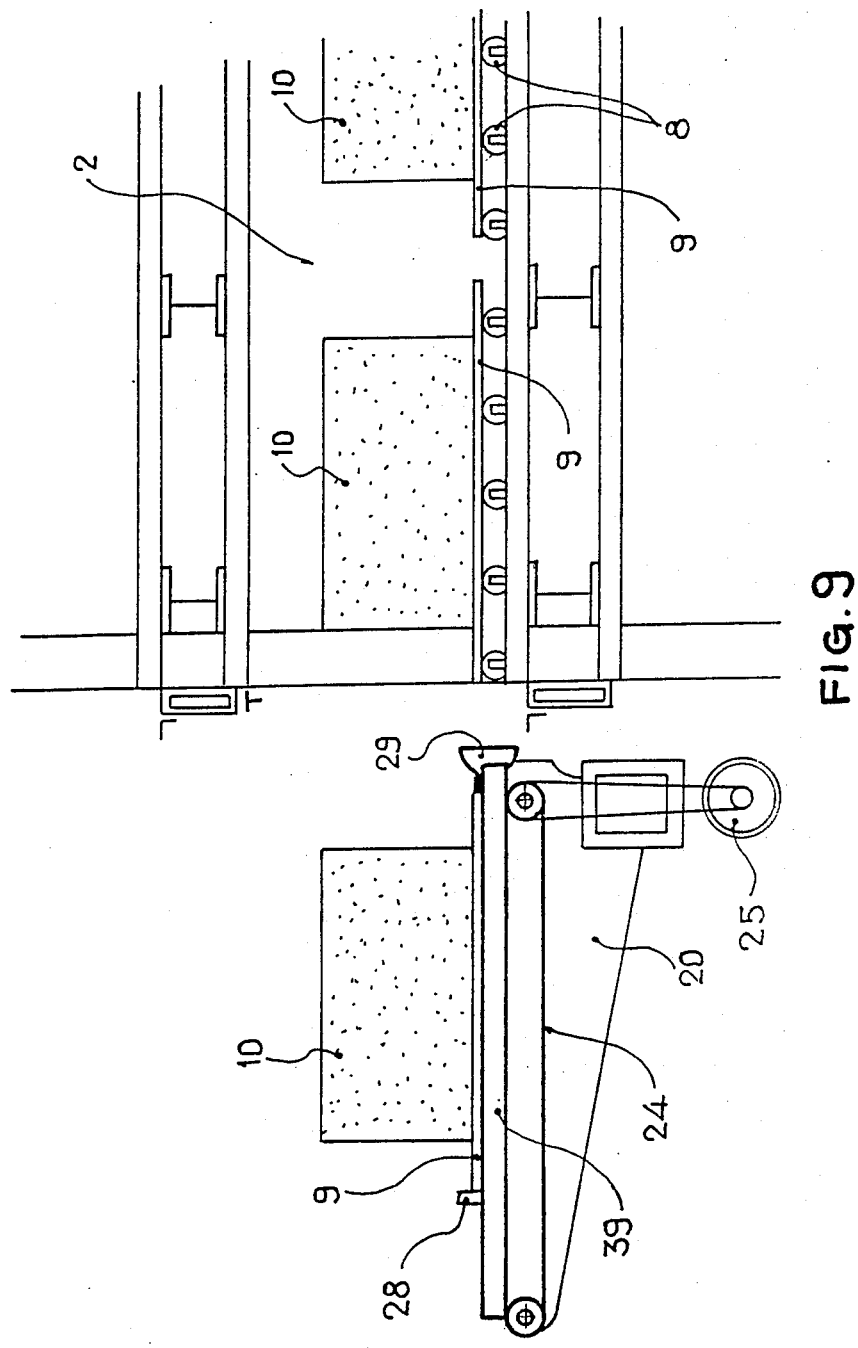
Figure 10:
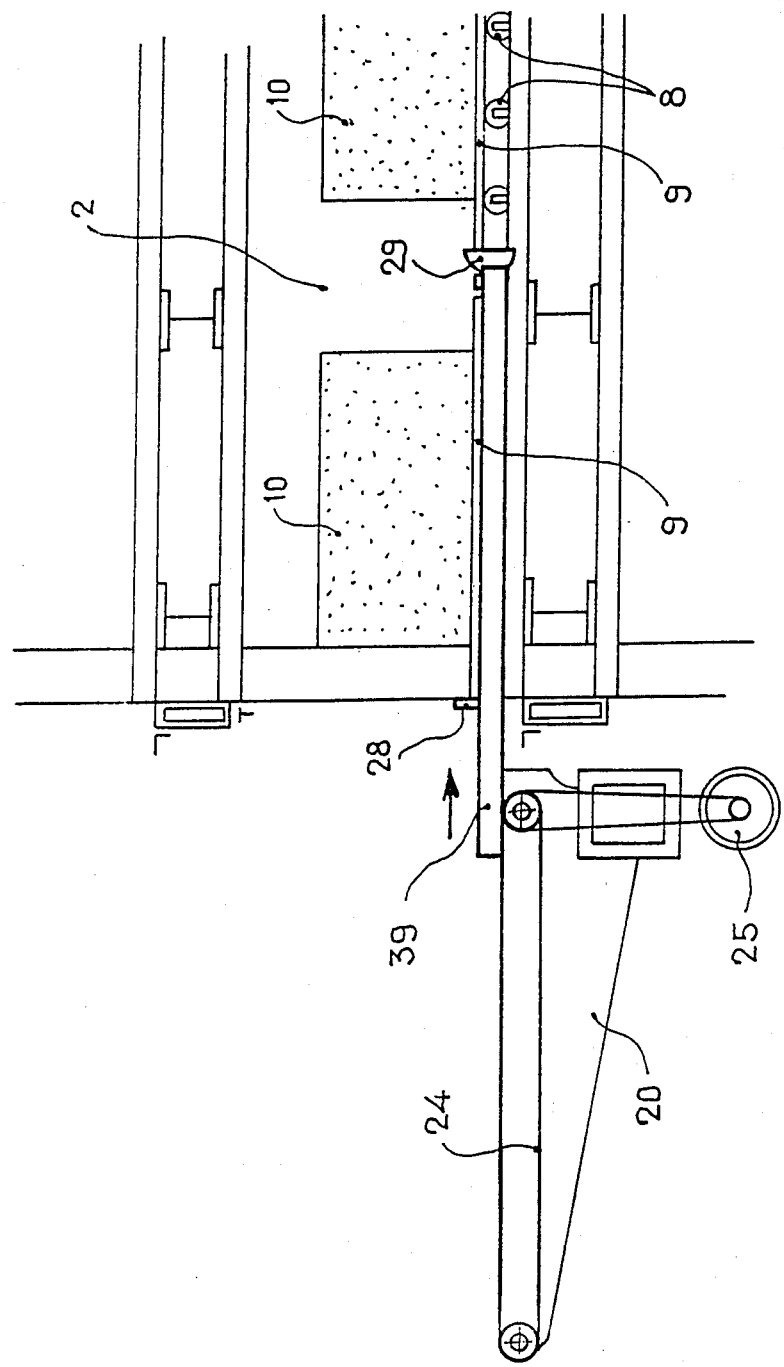
Figure 11:
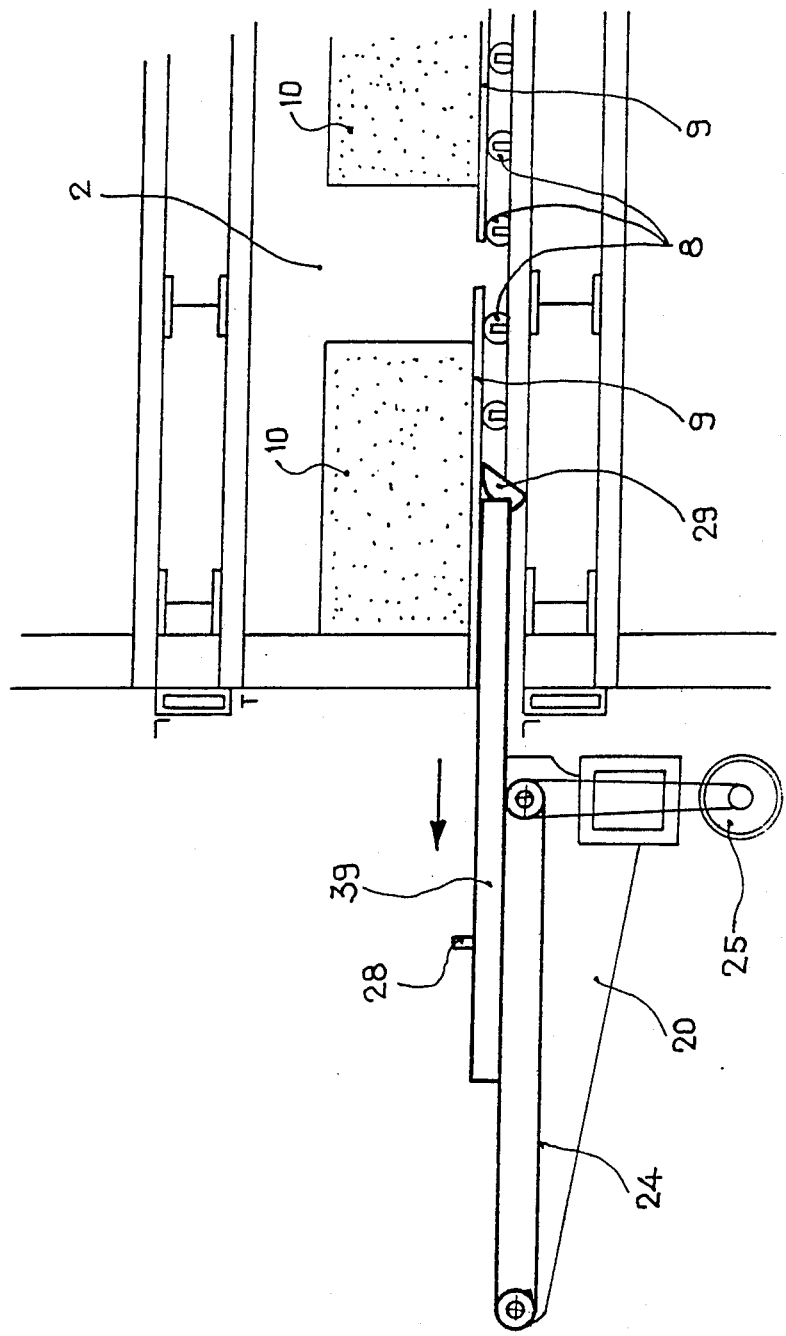

The chamber inclination can be seen in FIG. 1. This inclination means a lot of advantages as it was previously mentioned. As it was also said before, panels (9) are made of thin metal sheet as shown in FIG. 2. Also in FIG. 2, and beneath each floor, covers (15) which make up the little roofs are shown. These roofs prevent the heat waste from lower to upper floors and, at the same time, they collect the excess of water, coming from the watering system, to prevent, in this way, the floor to floor dripping and the consequent deterioration of parts (10).

The operating sequence of the transfer unit (16) is prefectly described from FIG. 3 to 6. This unit is situated on the roller (17) conveyor belt which is loaded at the outlet of the part (10) moulding machine. Parts (10) come out from that machine to settle on the respective panels (9) which are placed on the conveyor belt (17). Panels (9) are conveyed up to the engine (18) operated transfer unit (16) which is raised by the engine (18) operated cams (19) to collect panels (9) loaded with parts (10) and take them in front of the lifter (20). This unit lifts the part loaded panels (9) up to the different floors (2).

As the transfer unit (16) operates the chain (22), by means of the engine (21), the panel (9) loaded with parts (10) will horizontally move towards the lifter (20). See FIGS. 4 and 5.

Once the panel (9) has been picked up by the lifter (20), the transfer unit (16) comes back to its rest position (FIG. 6) and the panel (9) is raised by means of the lifter (20) so as to be introduced the respective floor (2) of the chamber (1).

FIGS. 7 to 11 show all the innovations and additional components of the lifter (20). This unit is provided with some side mounted gusset-plates which can independently move forwards and backwards in relation to the own lifter (20).

These gusset plates (23) are connected to an engine (25) operated chain (24) in such a way that when the lifter (20) reaches the respective floor (2) height the gusset-plates move forward to push the respective floor (2) gate (26) and cause it to swivel (ver FIG. 8) and shift along a guide-rail (28) and by the action of the connecting rod (27). As the gate (26) swivels and shifts upwards, access to the floor (2) is gained to allow the respective panel (9) loaded with parts (10) to enter the chamber.

At the same time gusset-plates (23) move forward to open the floor gate (26), some pushers (39) fitted to the lifter (20) start moving forward, too. The panel (9) remains supported by these pushers which are provided with a rear fixed stop (28) and a front counterweight stop (29). As this last stop moves forward to the chamber inside, it will push the last panel (9) introduced, and at the same time, the next panel (9) will be about to enter the chamber (see FIGS. 10 and 11). Once this operation is over, pushers (39) will come back and the counterweight stop (29) will drop to get in contact with the introduced panel (9) bottom and allow this returning travel to take place. At the end of this travel, the counterweight stop recuperates its starting position and the floor gate (26) closes by its own weight as the gusset-plates (23) return to the rest position.

Figure 12:
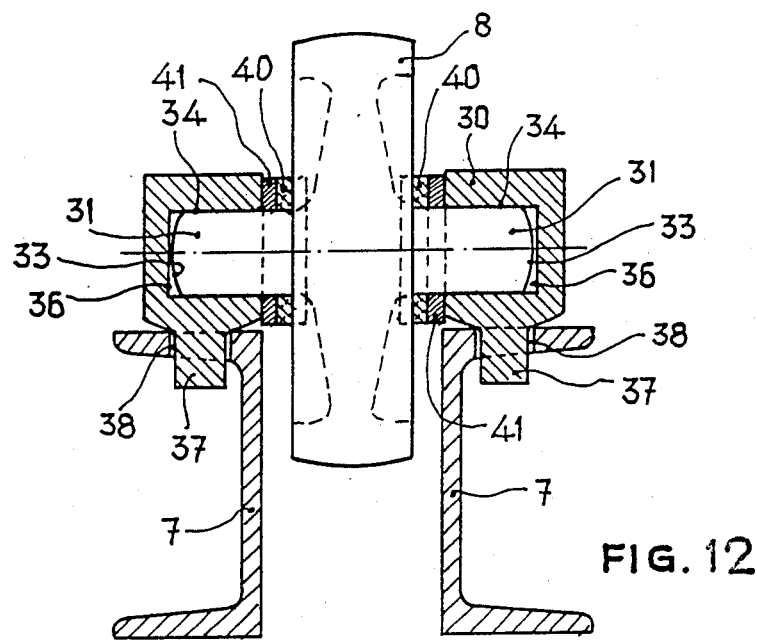
FIGS. 12 and 13 show the constitution of the self-levelling wheels which make up the rolling path. These peculiar wheels are mounted on suitable brackets attached to the upper flange of a "U" beam.
Figure 13:
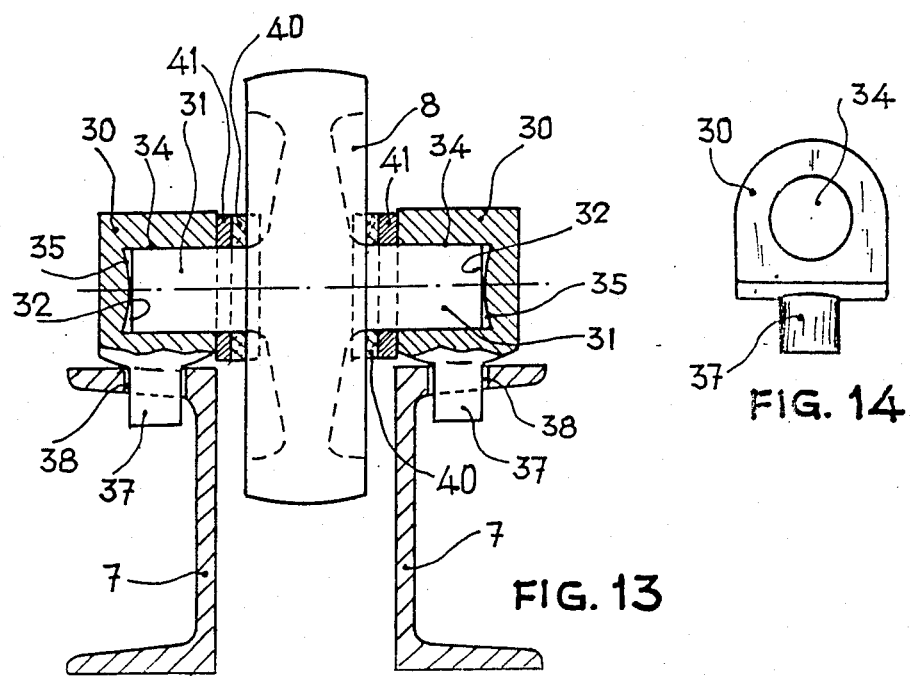
Figure 14:
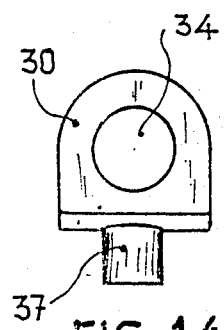
FIG. 14 shows the wheel bracket shape that supports each end of the self-levelling wheel shaft previously represented.

The rolling path is made up of a certain amount of self-levelling wheels (8) mounted on some brackets (30) which are attached to the upper flanges of "U" beam (7). See FIGS. 12 and 13.

Wheels (8) and brackets (30) are made of anti-corrosive material, in such a way that these wheels are provided with some cylindrical (31) side extensions which may be considered as actual shafts of the same. These extensions (31) or shafts may have a flat (32) (FIG. 13) or a convex curved (33) (FIG. 12) shape. In the first case, the extension housing bottom (34) of supports (30) should have a convex curved shape (35) and in the second case, the extension housing bottom should be flat (36).

Wheel brackets (30) are provided with some housings (34) to locate the wheel shafts or extensions (31). They also have some locating pins (37) to be positioned or situated on the flange hole (38) of beams (7). See FIGS. 12 and 13.

Because of the convex shape of the bracket (30) base, and the existing play between the hole (38) and the outer diameter of the locating pin (37), movements caused by some possible irregularities on that base or on the beams on which the rolling path is mounted can be easily absorbed.

In this way, the rolling path proper operation is easily obtained, since in addition to the convex shape and play above mentioned, the wheel shaft (31) will be supported at only one point of the housing (34) bottom (35) or (36) of the bracket (30).

The bracket (30), wheel (8) and shaft determined by the side extension (31) assembly is mounted on the "U" beams (7) just by inserting the locating pin (37) in the flange holes (38) of those beams (7).

To prevent dirt from being drawn into the bracket housing (34), a rubber ring (40), with its respective washer (41) made of anticorrosive material, is available.

I claim:

1. An apparatus for setting concrete parts in a chamber comprising:
   a plurality of floors, each said floor having a floor gate;
   beams mounted on each said floor;
   wheels mounted on said beams;
   panels slideably disposed upon said wheels so that said panels can transport said concrete along a rolling path;
   a roller conveyor belt to convey said panels from an originating location;
   a lifter for picking up and raising said panels to one of said floors, said lifter having side mounted gusset plates suitably mounted to cause the opening of said floor gates by direct pressure so that said panels and said concrete can be introduced onto said floors;
   a transfer unit for transferring said panels from said roller conveyor belt to said lifter, said transfer unit designed to move in both vertical directions;
   a pushing element attached to said lifter, said pushing element having a pusher, a rear fixed stop and a front counterweight stop, a said panel is placed on said pusher between said rear fixed stop and said front counterweight stop, said front counterweight stop being positioned and designed to push the panel previously introduced onto the floor to make room for the panel carried by said pusher, said front counterweight stop also to prevent panel carried by said pusher from being deposited upon panel previously introduced onto the floor;
   said floor inclined at a suitable angle to encourage movement of panels along the rolling path; and
   a spary watering system to promote the desired humidity within said chamber.

2. An apparatus for setting concrete parts in a chamber as recited in claim 1 further comprising:
   an engine synchronized to operate the various movements of said transfer unit, either inside or outside said chamber; and
   cams disposed upon said transfer unit for raising and lowering the transfer unit to collect said panels from the roller conveyor belt for deposition onto said lifter.

3. An apparatus for setting concrete parts in a chamber as recited in claim 1 wherein said front counterweight stop is so swiveably disposed upon said pusher so that it maintains a vertical position when said pusher is moving forwaard to push the panel previously introduced onto a said floor, then as said gusset plate reverses direction, said front counterweight stop drops to a position permitting the pushing element to be displaced under the panel it is carrying, so that said pushing element can be withdrawn from said floor while said panel is discharged on said floor.

4. An apparatus for setting concrete parts in a chamber as recited in claim 1 further comprising:
   guide-rails attached to each floor; and
   connecting rods connected to said floor gates, said guide-rails, said connecting rods and said floor gates so cooperatively designed so that an exertion of horizontal pressure by said gusset plate causes said floor gate to upshift through said guide rails and permit said gusset plate to enter said floor, said floor gate then downshifting due to gravity as said gusset plate is withdrawn from the floor.

5. An apparatus for setting concrete parts in a chamber as recited in claim 1 further comprising:
   brackets, said brackets having locating pins and bracket housings;
   said beams having flanges and flange holes through said flanges, said brackets being attached to said beams by the insertion of said locating pins through said flange holes;
   rubber rings;
   washers;
   said wheels made of anticorrosive material and having wheel shafts extending radially from opposite sides of said wheels, said wheels disposed upon said bracket housings, said rubber rings and said washers positioned on said wheel shafts between said wheels and said brackets.

6. An apparatus for setting concrete parts in a chamber as recited in claim 5 further comprising:
   said bracket housings having a bracket base that is convex in shape, and wherein said locating pins and said flange holes are so designed that said wheels are permitted to absorb uneven distributions due to irregularities of said beams.

7. An apparatus for setting concrete parts in a chamber as recited in claim 6 wherein said bracket base has a convex curved shape and said wheel shafts has ends that are flat, so that said wheels can be supported at one point.

8. An apparatus for setting concrete parts in a chamber as recited in claim 5 wherein said bracket housing has a bracket base and said bracket base has a convex curved shape and said wheel shafts has ends that are flat, so that said wheels can be supported at one point.

9. An apparatus for setting concrete parts in a chamber as recited in claim 5 wherein said bracket base is flat and said wheel shafts have ends that are convex in shape, so that said wheels can be supported at one point.

10. An apparatus for setting concrete parts in a chamber as recited in claim 5 wherein said bracket base is flat and said wheel shafts has ends that are convex in shape, so that said wheels can be supported at one point.

11. An apparatus for setting concrete parts in a chamber as recited in claim 1 wherein said spray watering system comprises:

side and central pipes;

suitable spray nozzles attached to said side and central pipes, said side and central pipes situated along each floor in a longitudinal direction and appropriately programmed to maintain desired humidity and watering of each floor.

12. An apparatus for setting concrete parts in a chamber as recited in claim 1 further comprising a cover attached to the roof of each floor, said cover designed to prevent loss of heat from each floor and also to collect and drain said water from said spray watering system.

* * * * *